De Witt C. Morrey,
Boot Crimper.
No. 2,826. Reissued Dec. 31. 1867.
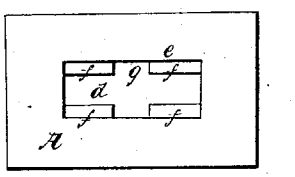
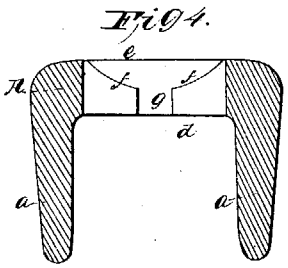
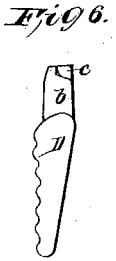
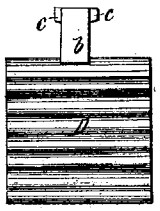
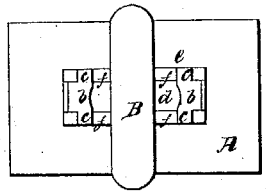
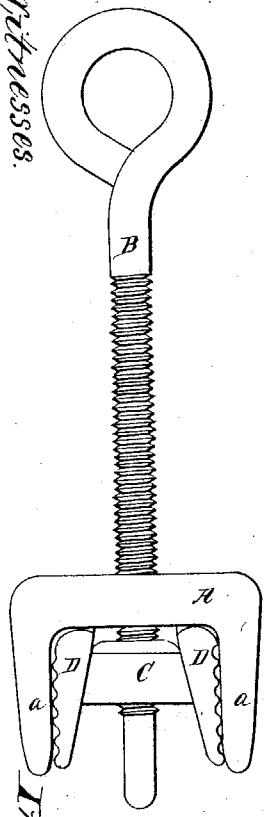
Witnesses.
Samuel A. Piper
Geo. H. Andrews
Inventor
Dewitt C. Morey
by his attorney
R. H. Duty
PETERS, PHOTO-LITHOGRAPHER, WASHINGTON, D. C.

United States Patent Office.

DE WITT C. MOWREY, OF MILFORD, MASSACHUSETTS.

*Letters Patent No.* 66,035, *dated June* 25, 1867; *reissue No.* 2,826, *dated December* 31, 1867.

IMPROVEMENT IN BOOT-CRIMPERS.

The Schedule referred to in these Letters Patent and making part of the same.

TO ALL PERSONS TO WHOM THESE PRESENTS SHALL COME:

Be it known that I, DE WITT C. MOWREY, of Milford, in the county of Worcester, and State of Massachusetts, have invented a new and useful Improvement in Boot-Crimpers; and do hereby declare the same to be fully described in the following specification, and represented in the accompanying drawings, of which—

Figure 1 is a side elevation, and

Figure 2 a top view of a crimper provided with my invention.

Figure 3 is a top view, and

Figure 4 a longitudinal section of the jaw-carrier.

Figure 5 a side view, and

Figure 6 an edge view of one of the movable jaws.

This boot-crimper, in some respects, resembles that for which Letters Patent, dated January 20, 1844, were granted to Josiah M. Reed, that is to say, each has a jawed clasp or pyramidal block or frustum, and a straining-screw.

I have, however, combined therewith, in manner as hereinafter described, two movable jaws, which are forced towards the jaws of the clasp by means of the action of the straining-screw and the pyramidal frustum, while the crimper is in the act of being used for straining the leather of a boot-leg upon a boot-form. The auxiliary or movable jaws enable the crimper to hold the leather firmer, without abrading it, than with the boot-crimper of said Reed, in which, while the leather is being strained, the frustum slides on and is apt to injure it.

In the drawings, A denotes the clasp, formed with the jaws *a a*, as represented. B is the straining-screw, and C the pyramidal block or frustum, through which such screw is screwed. The auxiliary jaws, D D, are arranged within the clasp, and on opposite sides of the frustum, and between it and the main jaws *a a*, the same being in manner as shown in the drawings. Each auxiliary jaw has an arm, *b*, extending up from it, such an arm, at its upper part, being provided with two ears, *c c*, projecting from it, as shown in figs. 5 and 6.

Furthermore, there is a long slot, *d*, made through the part *e* of the clasp, such slot being furnished with four curved supports for the ears of the auxiliary jaws to rest on. The straining-screw passes through the space *g*, which is between two pairs of the said supports, and serves to keep the ears of the arms upon them. Each of the supports, *f*, may have a flat upper surface, parallel with that of the clasp, but I prefer to make it inclined, because, when so made, it operates in an inclined plane to cause the jaw, by the force of gravity, when the crimper is in a vertical position, to move away from its fellow-jaw of the clasp, and thus prepare the jaws for the reception of the leather.

Furthermore, by the employment of the arms and ears, and the slot, provided with the supports, as described, (these latter being arranged with the passage *g*, as explained,) I am enabled to avoid the use of hinges to connect the auxiliary jaws to the clasp, and thus save much expense in the manufacture of the crimper. By the arrangement of the auxiliary jaws, in combination with the clasp, when the supports *f f f f* are parallel, it will be seen that the points of supports of the jaws, when the lower ends of such jaws are distended by the blocks C, are much nearer together than such lower ends. As a consequence, when the pyramidal block is lowered, the lower ends of such jaws approach each other, by their own gravity, and fall away from the jaws of the clasp, thus automatically making room for the insertion of the leather.

I would remark that instead of the supports *f f f f* being cast upon or within the body of the clasp, as described, a slotted plate may be applied to the top of the clasp, upon the top of which the ears *c c* may rest. It will also be apparent that the result above mentioned, *i. e.*, the automatic movement of the auxiliary jaws towards each other, when the straining-block is removed from between them, can be as well accomplished by giving the incline or bevel to the under side of the ears *c c* of the jaws, instead of to the supports *f*, or the slotted plate employed in lieu of such supports.

The jaws are applied to the clasp by inserting their arms up through the straining-screw passage *g* of it, and afterwards moving them so that their ears may take upon the supports *f f f f*.

I make no claim to the combination of the clasp, the straining-screw, and the pyramidal block, such being exhibited in the said patent of Reed.

I claim the combination, with the clasp and spreader, and the screw for operating the latter, of auxiliary or movable jaws, placed on each side of the spreader and supported upon and depending from the said clasp, so as to be located and held at all times between the jaws of the same, in the manner described, so that when the spreader is lowered, the movable jaws shall approach each other and recede from the jaws of the clasp, as herein specified.

I also claim the application of the auxiliary jaws to the clasp, by means substantially as described, viz, by the arms provided with ears, and by the slot having the supports arranged as set forth.

DE WITT C. MOWREY.

Witnesses:

FREDERICK CURTIS,

E. C. GRIFFITH.